United States Patent

[11] 3,594,627

[72] Inventor John c. Lesher
　　　　　　　Erie, Pa.
[21] Appl. No. 867,679
[22] Filed Oct. 20, 1969
[45] Patented July 20, 1971
[73] Assignee Teledyne, Inc.
　　　　　　　Los Angeles, Calif.

[54] CAPACITOR DISCHARGE BATTERY CHARGER
　　　11 Claims, 2 Drawing Figs.
[52] U.S. Cl. .................................................. 320/21,
　　　　　　　　　　　　　　　　　　 320/39, 321/2, 320/1
[51] Int. Cl. ................................................... H02j 7/02
[50] Field of Search .................................... 320/19,
　　　22—24, 39, 40, DIG. 1, DIG. 2, 1, 17; 321/2;
　　　　　　　　　　　　　　　　　　　　　331/117

[56] References Cited
UNITED STATES PATENTS
3,252,070　5/1966　Medlar et al. ................... 320/DIG. 2 UX
3,305,755　2/1960　Walsh .............................. 320/DIG. 2 UX
3,376,488　4/1968　Walsh .............................. 320/DIG. 2 UX Primary Examiner—J. D. Miller
Assistant Examiner—John M. Gunther
Attorney—Olson, Trexler, Wolters & Bushnell ABSTRACT: A capacitor discharge charger for charging a battery comprising: a capacitor electrically connected intermediate a source of power and the battery to be charged, a source of power for charging the capacitor, and means for alternately charging the capacitor from said power source and discharging it to the battery and therefore to charge said battery.

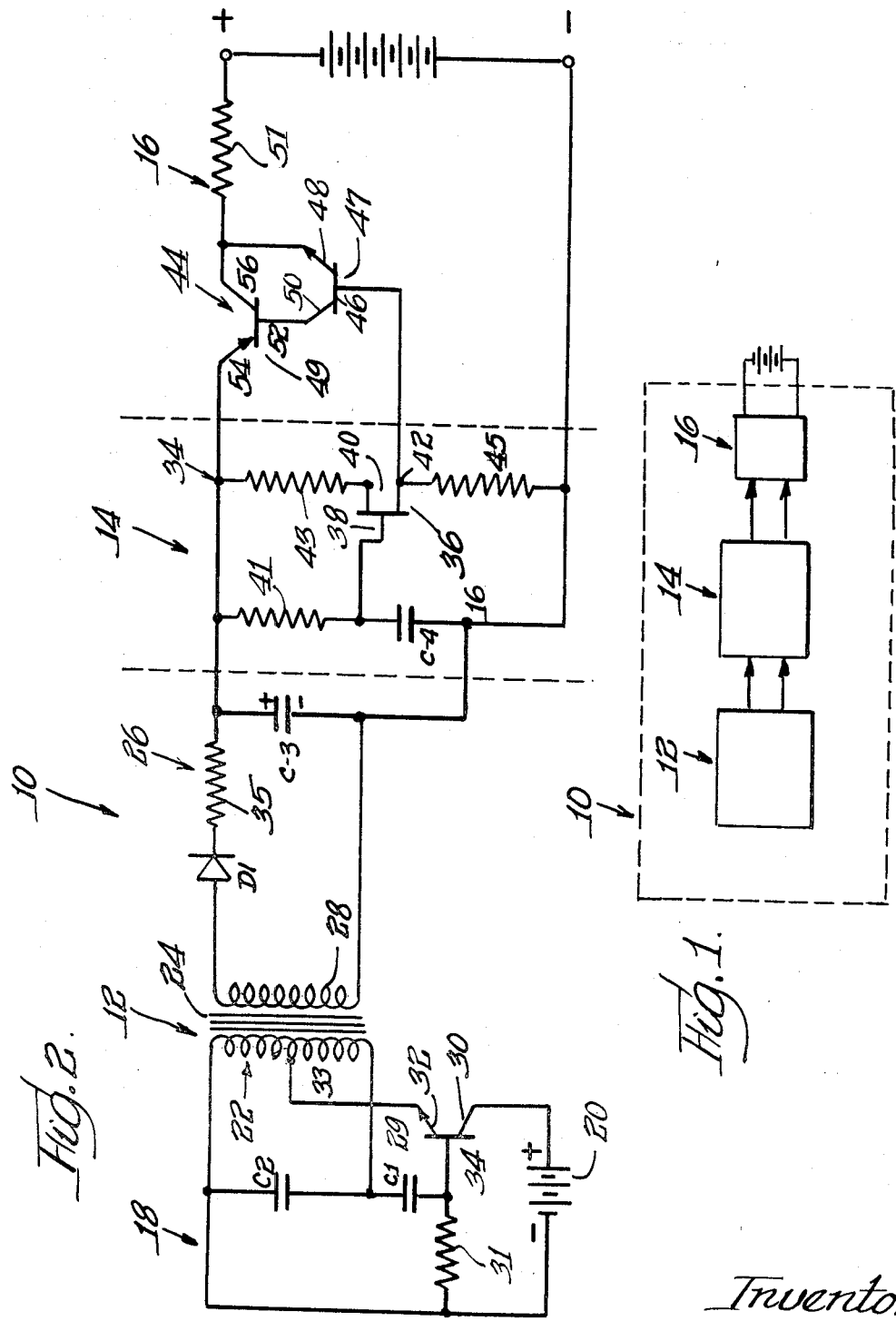

3,594,627

CAPACITOR DISCHARGE BATTERY CHARGER

SUMMARY OF THE INVENTION

This invention relates generally to a battery charger and more particularly to an automobile capacitor discharge battery charger.

DISTINCTIONS OVER PRIOR ART AND OBJECTS

Motorists at one time or another have had a battery run down caused by any one of several reasons including lights, radio, etc. being left on: short trips (into town) where the battery does not get a sufficient charge to maintain the battery gravity level; cold weather, which takes a good share of the battery power if the gravity level is not up to specification, etc.

If a battery, during cold weather, has a small trickle, or float charge, the gravity level can be maintained at all times. However, hooking up an auxiliary battery charger is not always practical since the vehicle may not be near a convenient outlet.

It would be ideal if this same trickle charge could prevail even while the vehicle is parked. However, if the battery was run down caused by short trips a higher charging current will be needed to regain the gravity level.

Most prior art battery charges charge continuously although often at a variable rate. A somewhat different approach is disclosed in accordance with U.S. Pat. No. 3,252,070 to Medler et al. The Medler et al. battery charger is of the pulse charge type. The chief object of this type of battery charger is to charge a battery intermittently leaving an idle time between charges, hence the term "pulse charge."

With particular regard to the Medler charger, two primary circuits make up the invention. A charging circuit of a conventional type is utilized to supply power directly from a power source to the battery. Secondly, a timing and switching circuit connects the charging circuit to the battery periodically. The charging source is taken from a stepdown transformer connected to a switch means such as a motor-driven timer, a gas discharge tube, a transistor or a silicon controlled rectifier. The timing is established by an RC circuit connected to the gate of the control device. The concept of the Medler invention relates to charging of the battery and maintaining the charge periodically while the battery is idle or in storage.

A common problem in the pulse-charge-type battery charger, for example Medler et al., is the high current which must necessarily be derived from a source to charge the battery being charged. This high current requirement is necessary because the Medler-type battery charger charges a battery directly from its source of power, periodically cutting this power off by means of its timing and switching circuit. Therefore, the amount of current utilized by the battery being charged must be equal to the amount of current derived from the source, and this could be extremely large.

A second common problem in the pulse-type battery charger of the prior art is related to the problem discussed above. Specifically, since this type of battery charger charges its battery with current directly from the power source and since such current may be extremely high in value, an outside power source is necessary. This becomes extremely inconvenient and costly when the battery being charged is that of an automobile battery. The prior art battery charger generally uses an independent source which in the case of automobile battery charging is generally located in a garage of the automobile owner. The power may however be derived directly from the owner's house. In either case, the charging stage can only take place while the automobile is parked in the garage or adjacent to the house.

Therefore, a general object of the present invention is to provide an improved battery charger which overcomes the limitations of the prior art by utilizing a low input current for charging a battery.

Another general object of the present invention is to charge a battery using a small battery pack as a power source, which battery pack is included in the charger housing making it a self-contained unit.

Yet another object of the present invention is to provide an improved battery charger which uses a capacitor discharge circuit to charge a battery.

These and other objects and features of the invention will become more apparent from a reading of the following descriptions.

BRIEF DESCRIPTION OF THE DRAWING

In order that the principle of the invention may be readily understood, a single embodiment thereof applied to a capacitor discharge battery charger but to which the application is not to be restricted is shown in the accompanying drawing wherein a capacitor discharge battery charger circuit is displayed.

FIG. 1 is a block diagram illustrating the invention; and,

FIG. 2 is a schematic wiring diagram thereof.

DETAILED DESCRIPTION

Attention should first be directed to FIG. 1 in connection with the following brief description as to how the present capacitor discharge battery charger 10 operates. The circuit as a whole comprises three functional subcircuits which interact with each other ultimately to charge a battery. The first subcircuit 12 consists of a resonant feedback oscillator circuit, a step-up transformer circuit, and a capacitor discharge circuit. The second subcircuit 14 which is connected across the output of the first subcircuit consists of a unijunction transistor circuit. Attached to the output of the unijunction transistor circuit is a third subcircuit 16 which includes two transistors tied appropriately to each other to function as a saturated switch. The output of the entire circuit is connected to the battery being charged.

The resonant feedback oscillator circuit which is of a known kind is powered by a battery source which may be a small battery pack included in the battery charger's housing making the battery charger a self-contained unit 10. The output of the resonant feedback oscillator is applied to the step-up transformer circuit whose output is used to charge a capacitor contained within the capacitor discharge circuit which capacitor quickly discharges its current to the battery being charged. The oscillator circuit supplies a low current output to the step-up transformer which developes approximately 40 volts AC across its secondary winding. The capacitor has a constant of approximately 18,000 microfarads and requires approximately 10 seconds to be charged to its full capacity. The capacitor may thereafter discharge approximately 2½ amps to a 12-volt battery being charged in about one-fourth of a second. These values may, of course, be changed if a battery other than a 12-volt battery is being charged.

The second subcircuit which is made up of a unijunction transistor circuit is used to determine when the capacitor of the first subcircuit has obtained its capacity. When this has occurred the unijunction transistor circuit delivers a pulse to the input of the third subcircuit 16 which acts as a saturated switch creating a direct path from the capacitor to the battery for allowing the capacitor to discharge directly into the battery being charged.

In summarizing the above, a battery which has lost its charge due to use is appropriately connected to the capacitor discharge charger 10 which is housed as a self-contained unit. The charger may, for example be connected to the cigarette lighter receptacle. A power source contained in the housing, preferably a small battery pack, emits a low current output over a period of time (approximately 10 seconds) which charges a capacitor to its full capacity via a resonant feedback oscillator and step-up transformer. When the capacitor has charged to full capacity the unijunction timing circuit of the second subcircuit actuates the saturating switch arrangement of the third subcircuit to allow the capacitor to discharge its stored energy to the battery. Since the discharging process of the capacitor takes much less time (one-fourth of a second) than the charging of said capacitor (approximately 10 seconds) the current ultimately delivered to the battery (2½ amps) is much greater than that current delivered to the capacitor from the battery source thus allowing the charger to use a source such as a battery pack.

Referring now in detail to FIG. 2, a capacitor discharge charger 10 is shown comprising a first subcircuit 12, a second subcircuit 14 and a third subcircuit 16 which is connected to a 12-volt battery being charged.

The first subcircuit 12 includes a resonant feedback oscillator circuit 18 powered by a battery source 20 and connected to the primary winding 22 of a step-up transformer 24. The capacitor discharge circuit 26 is connected across the secondary winding 28 of transformer 24.

The resonant feedback oscillator circuit is of a conventional type which includes a transistor 29 with its collector 30 connected to the positive side of battery 20, its emitter 32 connected to the primary winding 22 of transformer 24 by a movable tab 33 and its base 34 connected intermediate the negative side of battery 20 and one side of primary winding 22 through a resistor 31. Two capacitors C1 and C2 are placed in series and have one end thereof connected intermediate the base 34 of transistor 29 and resistor 31 and the other end connected intermediate the negative side of battery 20 and one side of primary winding 22. One side of primary winding 22 is connected to the negative side of battery 20 and the other side of the primary winding is connected intermediate the capacitors C1 and C2.

Since the resonant feedback oscillator arrangement is of a conventional type it is not necessary to discuss particular values of the individual elements therein. Functionally, the movable tab 33 is so positioned on the primary winding 22 that the step-up transformer 24 has an output of approximately 40 volts AC across its secondary windings 28.

The capacitor discharge arrangement 26 comprises a capacitor C3 connected across the secondary windings 28 of transformer 24 through a diode D1 which rectifies the AC output of the step-up transformer and the resistor 35 which limits the current that charges the capacitor C3. As stated above, the capacitor C3 has a value of 18,000 microfarads and has the ability to store up to 2½ amps which may ultimately be discharged to a 12-volt battery being charged.

The second subcircuit 14 is connected across the capacitor C3 and comprises a unijunction transistor timing circuit 34. The unijunction transistor timing circuit comprises a unijunction transistor 36 with emitter 38, base 40 and base 42, a capacitor C4 and resistors 41, 43 and 45. The emitter 38 of unijunction transistor 36 is connected intermediate the resistor 41 and capacitor C4 which are connected in series across the capacitor C3. The base 40 of unijunction 36 is connected to one end of resistor 43 which is connected parallel to resistor 41 and base 42 is connected to one end of resistor 45 which is connected parallel to capacitor C4.

Functionally, the capacitor C4 is charged by a limited current from the output of step-up transformer 24. The current used to charge C4 is limited by resistor 41 thus allowing the majority of this current to charge capacitor C3. When capacitor C3 has obtained its full charge, i.e. when it has enough energy stored to discharge at approximately 2½ amps, the capacitor C4 will discharge through the emitter 38 of unijunction transistor 36 and to the subcircuit 16, the resistor 45 preventing this discharge current from going to ground before reaching subcircuit 16.

The third subcircuit 16 which consists of a saturating switch circuit 34 is connected across the output of unijunction transistor 36. The saturating switch circuit consists of an NPN-type transistor 47 with base 46, emitter 48 and collector 50, a PNP-type transistor 49 with base 52, emitter 54 and collector 56 and a limiting resistor 51.

The transistor 47 has its base 46 connected to the base 42 of unijunction transistor 36 while its collector 50 is connected to the base 52 of 49 and its emitter 48 is connected to the collector 56 of transistor 49. The emitter 54 of transistor 49 is connected to the discharge side of capacitor C3. The resistor 51 is connected at one end to the collector 56 of transistor 49 and at its other end to the positive side of the battery being charged. The battery being charged is, of course, connected directly across the entire capacitor discharge charger circuit.

The saturated switching circuit 44 operates in the following manner: the discharge current which is derived from the unijunction transistor timing circuit 34 properly biases the base 46 of transistor 47 which in turn properly biases the transistor 49 at its base 52 thus allowing full conduction of transistor 49. This in turn allows capacitor C3 to discharge through transistor 49 and limiting resistor 51 to the battery being charged. The limiting resistor 51 protects the transistor 49 from high surge current. As long as the capacitor C4 continues to discharge current to the base 46 of 47, 49 will maintain its conductive state allowing C3 to discharge to the battery being charged.

In order that the unique aspects of applicant's invention may be more fully appreciated, a discussion of its operation as a whole will now be given.

The capacitor discharge battery charger is connected across the battery being charged. If, for example, the battery being charged is an automobile battery, the charger may be plugged into the cigarette lighter receptacle of the automobile as a quick convenient connection, or it may be installed permanently in the vehicle.

The battery 20 of the capacitor discharge battery charge 10 supplies power to the resonant feedback oscillator 18 which in turn is used by the step-up transformer 24 to provide an output voltage of 40 volts AC across its secondary windings 28. This in turn provides a small current through the rectifying diode D1 and limiting resistor 35 for charging capacitor C3 and capacitor C4. However, due to resistor 41 only a small portion of this current will be directed to capacitor C4. Since the transistor 49 at this point is in a nonconduction state, no current will pass to the battery. The timing capacitor C4 is of appropriate value to allow capacitor C3 to charge to its full capacity before discharging to the battery. When the capacitor C3 has charged to its full capacity the capacitor C4 discharges through the unijunction transistor 36 and to the base 46 of transistor 47. This allows the transistor 49 to go from a nonconduction state to a full conduction state so that the capacitor C3 may discharge through the transistor 49 and resistor 51 to the battery being charged. Since the time required for the capacitor C3 to discharge is much less than that time required for it to be charged, the current which is delivered to the battery is of a much greater amplitude than that current used to charge the capacitor C3.

While particular embodiments of the invention have been shown, it should be understood, of course, that the invention is not limited thereto since many modifications may be made and it is therefore contemplated to cover by the present application and such modifications that fall within the true spirit and scope of the appended claims.

The invention I claim is as follows:

1. A capacitor discharge charger for charging a battery comprising: a capacitor electrically connected intermediate a source of power and the battery to be charged, a source of power for charging said capacitor, means for alternately charging said capacitor from said power source and discharging it to said battery and therefore to charge said battery, a resonant feedback oscillator circuit and a transformer electrically connected intermediate said source of power and said capacitor whereby a low current may be maintained to charge said capacitor, said charging and discharging means including a unijunction transistor timing circuit for determining when said capacitor has reached a predetermined charge, and a saturated switching circuit for discharging said capacitor to said battery when said capacitor has reached its predetermined charge, said unijunction transistor timing circuit and switching circuit being electrically connected intermediate said capacitor and said battery whereby the discharge to said battery is of greater magnitude than the charge to said capacitor.

2. A capacitor discharge charger for charging a battery comprising: a capacitor electrically connected intermediate a source of power and the battery to be charged, a source of power for charging said capacitor, means for alternately charging said capacitor from said power source and discharging it to said battery and therefore to charge said battery, said charging and discharging means including a unijunction transistor timing circuit for determining when said capacitor has reached a predetermined charge, and a saturated switching circuit for discharging said capacitor to said battery when said capacitor has reached its predetermined charge, said unijunction transistor timing circuit and switching circuit being electrically connected intermediate said capacitor and said battery whereby the discharge to said battery is of greater magnitude than the charge of said capacitor.

3. A capacitor discharge charger according to claim 1 wherein said unijunction transistor circuit includes a second capacitor connected across the first capacitor and a unijunction transistor means connected intermediate said second capacitor and said switching circuit whereby said second capacitor charges in the same manner as said first capacitor and discharges a current signal through said unijunction transistor means to said switching circuit for allowing said first capacitor to discharge to said battery.

4. A capacitor discharge charger according to claim 3 wherein said switching circuit includes a first transistor electrically connected to said unijunction transistor means for receiving said discharge signal and a second transistor electrically connected to said first transistor whereby said second transistor becomes fully conductive allowing said first capacitor to discharge to the battery when said first transistor receives said signal.

5. A capacitor discharge charger for charging a battery comprising: a capacitor electrically connected intermediate a source of power and the battery being charged, a source of power for charging said capacitor and means for alternately charging said capacitor from said power source and discharging it to said battery and therefore to charge said battery, said last-mentioned means including a unijunction transistor timing circuit for determining when said capacitor has reached a predetermined charge and a saturated switching circuit for discharging said capacitor to said battery when said capacitor has reached its predetermined charge, said unijunction transistor timing circuit and switching circuit being electrically connected intermediate said capacitor and said battery whereby the discharge to said battery is of greater magnitude than the charge to said capacitor, said unijunction transistor circuit including a second capacitor connected across the first-mentioned capacitor and a unijunction transistor means connected intermediate said second capacitor and said switching circuit whereby said second capacitor charges in the same manner as said first capacitor and discharges a current signal through said unijunction transistor means and said switching circuit for allowing said first capacitor to discharge to said first battery and said switching circuit includes a first transistor electrically connected to said unijunction transistor means for receiving said discharge signal and a second transistor electrically connected to said first transistor whereby said second transistor becomes fully conductive allowing said first capacitor to discharge to the battery when said first transistor receives said signal.

6. The method of charging a battery comprising the steps of supplying a low current to a capacitor for a period of time to charge said capacitor substantially to a predetermined potential, discharging a higher current from said capacitor to the battery to be charged at a predetermined point in time when the capacitor has substantially reached its predetermined charge and over a shorter period of time than required to charge said capacitor, said method further including the step of charging a second capacitor in the same manner as the first capacitor and discharging a current signal from said second capacitor to a switching circuit and thereby to discharge said capacitor through said switching circuit to said battery at said predetermined point of time.

7. A capacitor discharge battery charger comprising a capacitor, means for charging a capacitor from a source of power at a predetermined relatively low rate, an output circuit connected to said capacitor and adapted to be connected to a battery to be charged and including a controlled electronic switch is circuit with said capacitor and having a control element for holding said switch off or for turning it on to discharge said capacitor at a relatively high rate to a battery to be charged, and a timing circuit connected in circuit with said capacitor and to said control element for turning said electronic switch on when said capacitor substantially reaches a predetermined potential.

8. A battery charger as set forth in claim 7 wherein the timing circuit comprises a resistance-capacitance timing circuit.

9. A battery charger as set forth in claim 8 wherein said output circuit further includes an electronic switch device connected to said resistance-capacitance timing circuit and to the control element of said controlled electronic switch.

10. A battery charger as set forth in claim 7 wherein the means for charging the capacitor comprises a two-element rectifying device.

11. A battery charger as set forth in claim 7 and further including a source of power comprising a battery, an oscillator connected to and powered by said battery, and a rectifier interconnecting said oscillator circuit and said capacitor.